United States Patent [19]

Daspit

[11] Patent Number: 4,790,886

[45] Date of Patent: Dec. 13, 1988

[54] METHOD AND APPARATUS FOR REMOTE UNDER WATER TORCH CUTTING

[76] Inventor: Ronald A Daspit, 1301 E. Genie St., Chalmette, La. 70043

[21] Appl. No.: 124,584

[22] Filed: Nov. 24, 1987

[51] Int. Cl.⁴ ............................ B23K 7/04; B23K 7/06
[52] U.S. Cl. .................................... 148/9 C; 148/9.6; 266/74
[58] Field of Search .................... 148/9 C, 9.6; 266/74

[56] References Cited

U.S. PATENT DOCUMENTS

2,286,191  6/1942  Aitchison et al. .................. 148/9 C
2,286,192  6/1942  Aitchison et al. .................. 148/9 C

*Primary Examiner*—Wayland Stallard
*Attorney, Agent, or Firm*—William H. Maxwell

[57] ABSTRACT

A method for torch cutting metal walls by burning powdered metals admixed with a gas oxidizer to establish a pre-heat flame at a cutting zone and followed by continuously adding a gas cutting agent for intensifying said flame cutting through the metal wall by burning and melting, and an apparatus to implement this method and which locates a body to the wall to be cut and carries and advances a torch over said wall with the discharge of said powdered metals and gases for preheat and followed by the continuous addition of said cutting agent for continuous cutting of the wall, and all of which is adapted to remote underwater operation within steel casings and over steel plate, as well as through other metals and materials.

47 Claims, 3 Drawing Sheets

METHOD AND APPARATUS FOR REMOTE UNDER WATER TORCH CUTTING

BACKGROUND OF THE INVENTION

This invention relates to under water cutting of steel walls or plates, and preferably the cutting of steel pilings. Heretofore, the methods for cutting steel underwater have been difficult to employ and the results thereof restricted. Oxy-hydrogen torches for this purpose have been provided for the introduction of compressed air into a surrounding sleeve in order to prevent the intrusion of water that would otherwise extinguish the flame; however cutting efficiently with that method is limited due to the excessive preheat time required, and only thin cuts can be made therewith, and without cutting through mud, scale, cement or rock etc. Another cutting method involves striking an electric arc in the presence of oxygen introduced through the cutting rod, which works well with steel but not with non ferrous materials and other compositions such as concrete, rock, coral, etc. Also, a good electric ground is often very difficult to attain.

An electrical development is the use of aluminum and/or magnesium rods within steel tube, used in steel cutting processes, with oxygen applied therethrough for oxidization. In the case of non-ferrous materials, the intense heat of burning crumbles the materials and the oxygen stream blows it away. Another development is the use of metal powders for intensifying heat and corrosive action. For example, mixtures of magnesium and iron dust support combustion in the presence of pure oxygen, but again with the use of a rod striking and electric arc. Such metal rods are self consuming in short lengths of time, which greatly shortens the cutting time. Furthermore, the use of electric arc cutting involves excessive down time because of the necessity to replace said rods so frequently; since such rods consume in 30 to 60 seconds. Therefore, it is a general object of this invention to provide a continuously operable method of cutting steel casings or plate underwater with a gas torch using powdered metal mixtures, without resort to electric arc rods that have been relied upon in the past.

Heretofore, it has been found to be difficult to attain sufficiently high preheat temperatures underwater, prior to discharge of the cutting agent such as pure oxygen, in order to perform cutting of steel plate such as that of casings. However, there are the aforesaid powdered metal mixtures that will raise the temperature of a flame considerably, but which are used sparingly because of their cost. Support for combustion of these powdered metals is the use of an oxidizer as a cutting agent. It is therefore an object of this invention to substantially raise preheat temperature in a cutting torch by providing the combustion of powdered metals, for example to raise the cutting zone temperature in excess of 4000° F. and under which condition a cutting agent is discharged therewith for cutting the steel casing or plate. With the exothermic condition thus provided, this torch will now melt through mud, clay, corrosion scale and marine growths, while efficiently cutting steel and other metals on a continuing basis.

It is an object of this invention to provide an underwater gas cutting torch with at least three distinct gas supplies; a first pilot gas or ignition supply; a second preheat gas mixture or high temperature supply; and a third cutting agent supply. In practice, the first supply is a mixture of oxygen and hydrogen for the establishment of an under water pilot or igniter flame which may be continuous burning; and alternately a spark igniter can be used in lieu thereof. The second supply is an admixture of metal dust, for example of magnesium, aluminum or iron carried by oxygen gas. And, the third supply is for example pure oxygen or the like.

It is an object of this invention to shield the first mentioned pilot or igniter flame from extinguishment by the surrounding waters into which the torch is immersed. To this end a shield surrounding the torch is supplied with a fourth gas, air, which flows under pressure therefrom to exclude the intrusion of water into the combustion chamber within said shield. In practice, the shield is retractile so as to pass over obstructions projecting from the surface of the steel to be cut.

It is an object of this invention to retract the torch until it is in a position to perform the cutting operation. To this end retractile advancement means is employed to retractably place the torch in a cutting position.

The torch angle with respect to the wall to be cut will vary, depending upon the disposition of the wall to be cut. The cut steel has a tendency to slough-off and blow back, as well as to drip downwardly. Therefore, when the cutting surface is inclined or vertical, the torch is preferably inclined so as to avoid the sloughing steel. In practice, the torch disposition will vary as circumstances require.

It is also an object of this invention to remotely control the position of the torch with respect to the cutting surface, after the torch has been placed in cutting position. In practice, when steel casing is to be cut, the torch is centered upon reaching the cutting position. As shown, retractile hydraulic means is provided to retractably center positioning legs that center the torch within the casing.

It is still another object of this invention to monitor and/or observe the progress of the cutting operation. To this end temperature probes and light probes are provided. For example, thermocouples sense the preheat temperature, and fiber optics sense the light intensity for visual observation. Also, closed circuit television can be employed.

SUMMARY OF THE INVENTION

It is necessary that a cutting torch operate efficiently in the under water cutting of steel casing and the like, and that its operation is not impeded by obstructions such as mud, scale, cement or rock, etc.. It is necessary that preheat is sufficient and attained in a short length of time. And, it is necessary that the cutting operation be monitored, so that cutting is implemented only when the required pre heat is attained. The underwater cutting torch disclosed herein provides these necessities and is adaptable to many under water situtations. A pilot flame is shielded from the intrusion of the surrounding waters, and/or a spark igniter is provided. Preheat is attained at high temperature by providing a powdered metal-gas supply. And, the cutting is achieved by discharging pure oxygen, hydrogen flouride or similar agent, when preheat temperature is reached, and all of which is monitored by temperature probes, light probes, and television cameras. A feature of this invention is the controlled positioning of the torch and its controlled drive for continuous cutting operation.

The foregoing and various other objects and features of this invention will be apparent and fully understood form the following detailed description of the typical preferred form and application thereof, throughout which description reference is made to the accompanying drawings.

THE DRAWINGS

And, FIG. 6 is an enlarged cross sectional view taken as indicated by line 6—6 on FIG. 5 and showing a centering means extension cylinder and piston means and its fluid connections.

PREFERRED EMBODIMENT

This invention relates primarily to remote underwater torch cutting that is effective in cutting steel and non ferrous materials including rock, coral etc.. The method herein disclosed is adapted to cut steel plates and casings and the like, which may be fouled with marine growth and other materials such as rock. This method employs metal powders such as mixtures of magnesium and iron dust that will increase combustion temperatures in the presence of an oxidizer, in order to attain the required preheat temperature and cutting temperature in a short length of time.

This method involves, generally, a preheat flame supplied with a dust admixture of combustible powdered metal or metals and a gas carrier, discharged and ignited in the presence of a cutting agent causing it to burn with intense heat through walls of material such as steel and the like. More particularly, this method involves the underwater torch discharge of a dust admixture of combustible powdered metal and a gas carrier for preheating the cutting zone to a temperature in the range of 3500° to 5000° F., followed by the admixture thereto of a calorie increasing cutting agent such as oxygen gas, so as to burn through the metal walls of material such as steel and the like.

In accordance with this invention, the calorie increasing agent can vary, a basic cutting agent being pure oxygen, discharged under pressure into the 3500°-5000° F. preheat flame, when the cutting zone established thereby has reached the required temperature (by observation or otherwise), and so that the steel or other metals combine with the oxygen cutting agent and cutting through the wall thereof. In practice, the caloric output increases within the preheat flame and is increased as the steel or other metal wall oxidizes and melts away at temperatures up to and exceeding 5000° F.

A calorie increasing agent for use with or in lieu of pure oxygen is hydrogen flouride, discharged under pressure into the 3500°-5000° F. preheat flame when the cutting zone established thereby has reached the required temperature (by observation or otherwise), and so that the steel as well as non ferrous materials are melted through. The hydrogen flouride is known to chemically attack metals and other materials at extremely high temperature in the range of 3500° F. and upward, and thereby cut through steel and other metals as well as rust, scale, rock, concrete, coral and mud etc.. In practice, the burning of steel with hydrogen flouride with oxygen results in ferrous and/or ferric flouride while dissipating the hydrogen, and thereby instantly melting through the aforesaid steel as well as melting through the other said non-ferrous materials.

In carrying out this invention, the metallic dust considered and used in basically of two types, flake dust and atomized dust, the latter configuration as stated, while atomized metallic dust is of minute spherical configuration. In practice, the atomized metallic dust used in carrying out this method or torch cutting steel plates and the like is of 100 to 325 micron mesh, which is admixed with a carrier of air or oxygen.

In practice and for example, approximately 0.27 LBS/minute of metal dust is admixed with 4.06 cubic feet of cutting agent gas, thereby establishing a ratio of 0.0666 LBS or metal dust per cubic foot cutting agent gas. This ratio varies dependent upon metal dust density and upon the jet or apertures through which the mixture is ejected. Chipped or flaked metal dust is not as reliable as the atomized spherical form thereof, since the latter does not tend to bridge up, and so does not clog passages and/or small openings and apertures. That is, spherical metal dust is free flowing and is most satisfactory under the conditions that prevail herein. The dust size that has given most satisfactory results is 200 (0.0029 inch dia.) to 325 (0.0017 inch dia.).

This method may also include a preliminary step of providing a pilot flame of combustible gas and an oxidizer; and alternately a spark applied momentarily for ignition. This inventive method resides in the use of powdered metal dust and a gas carrier that supports its combustion for preheating, followed by the introduction of an oxidizer to corrosively intensify the cutting action. In practice, the gas carrier for preheat is oxygen, providing a combustible dust mixture that burns at a 3500° to 5000° F. temperature for rapid preheating of the zone to be cut.

The method hereinabove described includes a preliminary step of ignition by means of a pilot flame or by a spark generator, and in an underwater environment the pilot flame is protected by burning it within a chamber and shielded from the surrounding waters. The first preheating step is conducted by burning powdered metal mixed as a dust in a carrier gas that supports combustion at 3500° F. to 5000° F. temperature suitable for preheating the cutting zone, using a gas such as air or oxygen. And the second cutting step is conducted by adding an oxidizer for corrosive action, such as pure oxygen and entered into the center of the prevailing preheat flame in order to intensify heating and corrosively burn through the wall to be cut and in the presence of the metal dust mixture that is continuously supplied thereto. The second step is continued until the desired cutting operation is completed and the steel piling or plate is severed. The metal powder and gas carrier is supplied under controlled pressure, and is supplemented by adding the gas oxidizer as a cutting agent which intensifies the existent flame and provides the corrosive action necessary to the rapid and continuous cutting action. The additional oxidizer or cutting agent can be a gas mixture of hydrogen fouride, in lieu of oxygen, used separately or in combination with oxygen, to attain a residue-free cutting operation. The completed cut is the slag-free with no chance for re-welding of the separated wall of steel, thereby eliminating separation problems.

Figure 1:
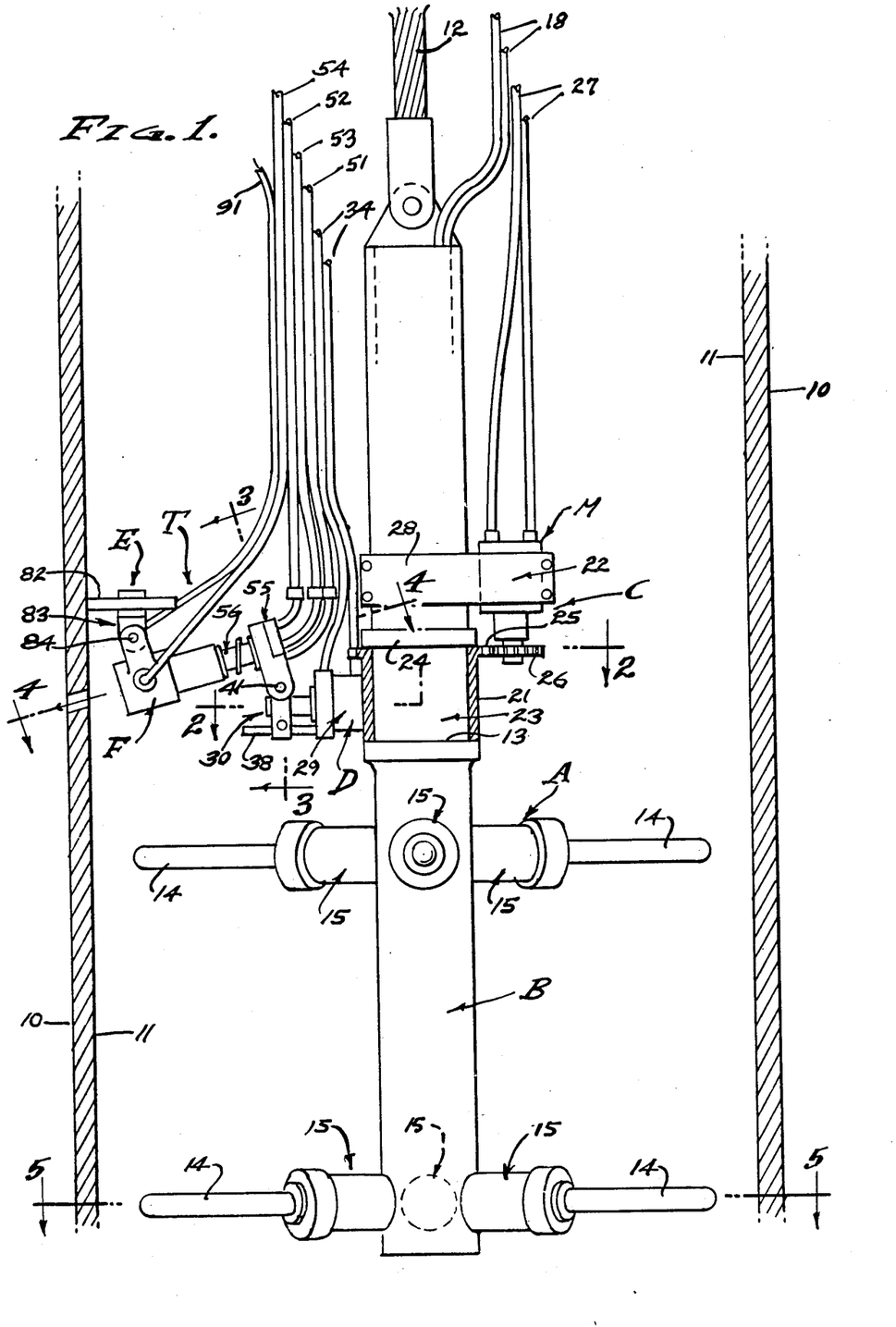
FIG. 1 is a vertical sectional view taken through a casing, with the apparatus of the present invention positioned therein and showing the process of cutting through the interior wall thereof.

Referring now to the drawings, I have shown an apparatus for remote underwater torch cutting of steel casing, using the powdered metal preheat and intensely corrosive cutting flame method hereinabove described. The casing is shown as a vertically disposed tubular member that is round in cross section, having outer and inner walls 10 and 11. The apparatus herein disclosed is designed to be inserted into and lowered in the casing to be cut circumferentially from the interior thereof, as is clearly shown. Accordingly, the apparatus carries a torch T supplied with powdered metal and gases, and under control of means as will now be described. The supply of combustible materials can be carried on and by the apparatus as by means of pressure bottles and canisters, or preferably remotely from the surface of the waters as shown.

The torch cutting apparatus as it is disclosed herein is comprised, generally, of a body B, locating means A for positioning the body, and a carriage and drive means C for advancing the torch T relative to the wall surface to be preheated and then cut or severed. A feature which facilitates insertion and lowering of the apparatus into the casing is a torch positioning means D which is retractile. Another feature which yields to interfering obstructions such as rust and scale and marine growth is a torch guide means E. This apparatus positions the torch T within the casing at a desired level and then drives the torch around the inner wall 11 thereof and in predetermined spaced relation thereto while supplied with the powdered metal dust and the added oxidizing or cutting agent to effect circumferential cutting of the casing on a continuing basis.

The apparatus of this invention will be described herein as it is adapted to the remote underwater cutting of steel casings. Accordingly the body B is an elongated vertically disposed member adapted to be inserted into and lowered to a determined depth or level within the casing. As shown, the body B is a slender tube that is subsequently centered coaxially within the inner casing wall 11, by the locating means A next described. In practice, the locating means A is at the lower end portion of body B, in which case the carriage and drive means C for carrying the torch T is carried by the body B with the upper end portion of the body accessible for the attachment of gas and hydraulic and electric lines as may be required. As shown, the body B is a tubular cylinder of relatively small diameter suspended by a cable 12 and having a support for the carriage and drive means C, the support being shown as an upwardly facing shoulder 13.

Figure 5:
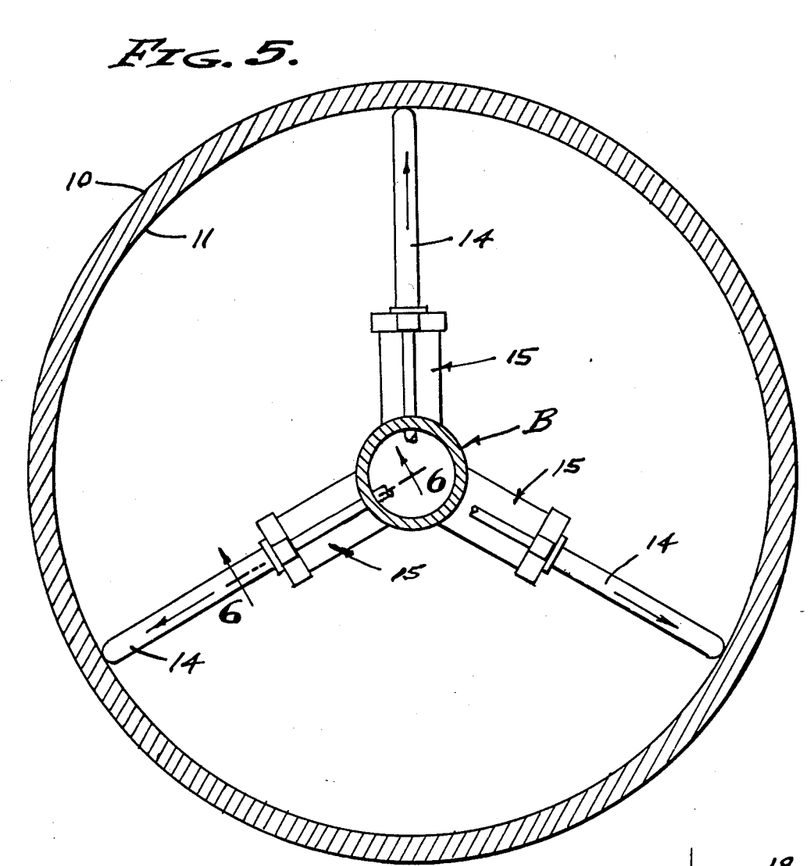
FIG. 5 is a horizontal sectional view taken as indicated by line 5—5 on FIG. 1 and showing the centering means for positioning the apparatus within the casing.
Figure 6:
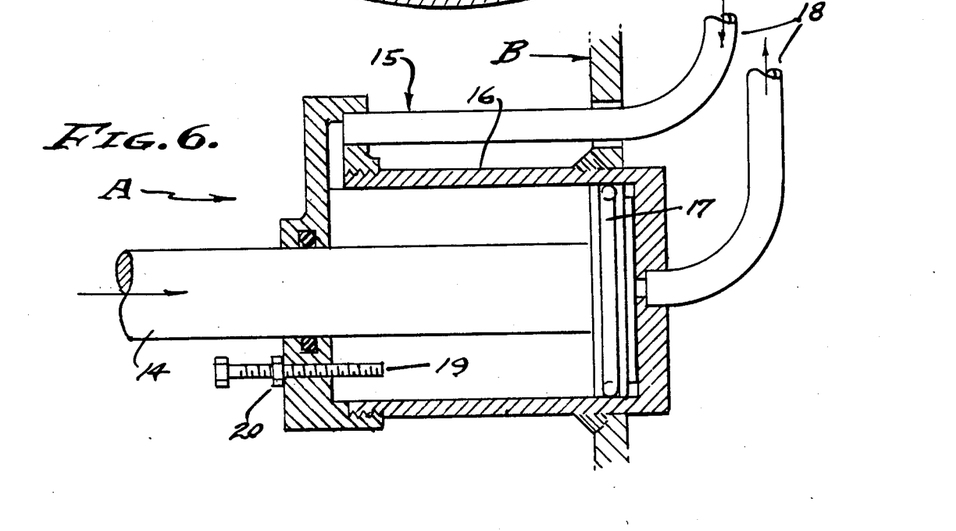

The locating means A as shown in Figs. 1, 5 and 6 positions the body B on the central axis of the casing, and is comprised of spaced retractile members extended into positioned engagement with the inner wall 11 of the casing. As shown, there are upper and lower sets of circumferentially spaced radially extensible members in the form of positionable legs 14 projecting from cylinder and piston means 15. There are at least three cylinder and piston means 15 at both the upper and lower positions, carrying the legs 14 horizontally and radially disposed from the center axis of body B. In practice, the cylinder and piston means 15 and legs 14 combinations are alike, preferably identical, and each involves a cylinder 16 carried by the wall of body B, and a piston 17 reciprocable on an axis radial to the axis of body B. The cylinder and piston means 15 is double acting, with the leg 14 connected to the piston 17 and projecting on said radial axis. As shown, fluid lines 18 communicate with opposite closed and/or sealed ends of the cylinder 16 and enter into the tubular body B so as to extend upwardly therefrom and to and above the water surface (not shown) for the control of operating fluid, preferably hydraulic fluid. The control therefor which is not shown, reversably pressures the lines 18 and simultaneously positions the cylinder and piston means 15, to either extend or retract the same. A feature of the cylinder and piston means 15 is an adjustable stop therefor, shown as a screw 19 entering the cylinder 16 to limit extension of piston 17 and leg 14, and with a lock nut 20. The limited extended positions of the legs 14 is shown in FIGS. 1 and 5, whereas the retracted position of the piston 17 and leg 14 is shown in FIG. 6. It will be understood that the retracted legs clear obstacles with the casing wall 11. It is also to be understood that the positioning means A can be carried by the upper end portion of body B, so as to be associated with the upper section of casing being severed and removed.

Figures 2, 3, 4:
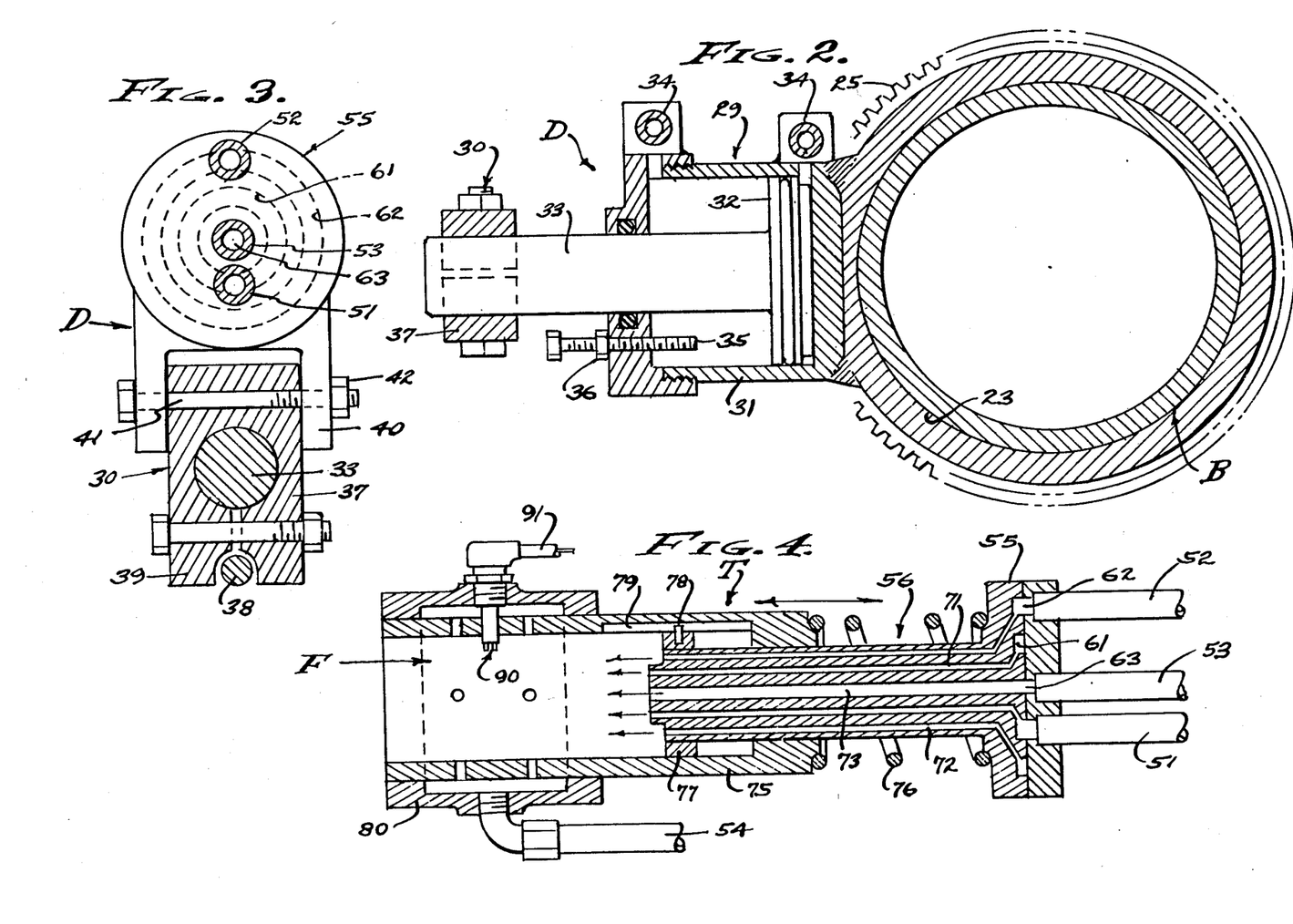
FIG. 2 is an enlarged cross sectional view taken as indicated by line 2—2 on FIG. 1 and showing the rotating carriage and torch extension cylinder and piston means therefor.
FIG. 3 is a view taken as indicated by line 3—3 on FIG. 1 and showing the torch mounting and its fluid supply connections.
FIG. 4 is a longitudinal sectional view of the torch taken as indicated by line 4—4 on FIG. 1.

The carriage and drive means C for advancing the torch T is shown in FIGS. 1 and 2, for advancing the torch around the inner casing wall 11. The carriage and drive means C is comprised of a collar 21 rotatable on the body B and a motor drive 22 to rotate the collar. Adjacent to and above the shoulder 13 on body B there is a concentric bearing cylinder 23 on which the collar 21 is free to rotate, the collar being a cylindrical member with its lower face slideably supported upon the shoulder 13, and with its upper face captured by a ring 24 secured onto the body. The collar 21 is positioned by the collar and ring to rotate at a determined height on the body B and has a driven gear 25 meshed with a drive gear 26 revolved by a motor M. The motor M is preferably a positive displacement type fluid powered motor for speed control by the rate of fluid flow through lines 27 extending therefrom and to and above the water surface (not shown) for adjustable flow of operating fluid, preferably hydraulic fluid. The control means, which is not shown, is any state of the art metering device that controls the rate of flow for precise speed operation of motor M and movement of the carriage collar 21. The collar 21 is driven continuously through one complete revolution when cutting off a section of casing. As shown, the motor M is carried by a bracket 28 at the exterior of body B, with the fluid lines 27 accessible as they extend to and above the water surface.

The torch positioning means D is shown in FIGS. 1, 2 and 3, and like means A hereinabove described is a retractile means for extending the torch T into working position. The torch positioning means D is comprised of a cylinder and piston means 29 carried by the collar 21 and an adjustment means 30 positioned thereby to carry the torch T. As best illustrated in FIG. 2, the cylinder and piston means 29 is carried by and projects radially from one side of the rotating collar 21 and involves a cylinder 31 and piston 32 reciprocal on a horizontally disposed radial axis from the center of rotation. The cylinder and piston means 29 is double acting, with a mounting bar 33 connected to the piston 32 and projecting on said radial axis. As shown, fluid lines 34 communicate with opposite closed and/or sealed ends of the cylinder 31 and extend upwardly therefrom and to and above the water surface (not shown) for control of operating fluid, preferably hydraulic fluid. The control therefor which is not shown, reversably pressures the cylinder and piston means 29, to either extend or retract the same. A feature of the cylinder and piston means 29 is an adjustable stop therefor, shown as a screw 35 entering the cylinder 31 to limit extension of piston 32 and mounting bar 33, and with a lock nut 36. The limited extended position of the mounting bar 33 is shown in FIG. 1, whereas the retracted position of the piston and bar is shown in FIG. 2. It will be understood that the mounting bar 33 is retracted so as to withdraw the torch T from the inner side wall 11 of the casing to clear obstacles when moving therein.

The adjustment means 30 for positioning the torch T carries the base of the torch next described, and swivels the torch so that its angular position with respect to wall 11 of the casing can be set as may be required. As shown, the adjustment means 30 is comprised of a clamp 37 adjustably positioned on the mounting bar 33 to move therewith. Since the mounting bar 33 is essentially a piston rod of round configuration and free to turn, there is a rigid guide rod 38 embraced by a bifurcated portion 39 of clamp 37 to maintain an erect and upright position of said clamp that carries the base of the torch T. The swivel of adjustment means 30 for adjusting the torch T is best illustrated in FIG. 3 and is comprised of a second clamp 40 disposed on a horizontal transverse axis normal to the axis of the mounting bar 33. The clamp 40 adjustably rotates on a pin in the form of a bolt 41 with a nut 42 which tightens the second clamp onto the first mentioned clamp 37. A typical angle of adjustment when cutting inside vertically disposed casing is approximately 15° as shown in FIG. 1.

The torch T which is unique with this invention is provided to handle at least two and preferably four separate fluid supplies, in order to practice the powdered metal preheat and intensified flame cutting method hereinabove described. Accordingly, there are two basic and preferably four fluid supply lines 51 - 54, all accessably extending to and above the water surface and connected to fluid supplies as will now be described. Line 51 is connected to a pressure and rate of flow regulated supply of metal dust admixed with a gas carrier or oxidizer as hereinabove described to establish a preheat flame at 3500° to 500020 F. And, line 53 is connected to a pressure and rate of flow regulated supply of the cutting agent such as oxygen, or hydrogen flouride, or a mixture of the two, as hereinabove described to be added to the above mentioned preheat flame so as to intensify the metal-oxidizer flame and thereby establish a corrosive burning and/or melting through of the steel casing, or other metal and materials that may be invovled. The cutting agent is introduced at a fixed point in the center of the preheat flame for an effective cutting effect. The third fluid supply line 52 is provided to supply a combustible compressed gas and oxidizer to a pilot means F. And, the fourth fluid supply line 54 is provided to supply a displacement gas such as compressed air to exclude and/or purge surrounding waters from the aforesaid pilot flame F.

The torch T is comprised of a manifold base 55 and a multi jet nozzle 56. The base 55 is secured to the clamp 40 of the torch mounting D and is coupled to the fluid lines 51, 52 and 53, the base having concentric inner and outer forwardly facing channels 61 and 62 in open communicatior with the lines 51 and 52 respectivley, and having a center port 63 in open communication with the line 53. The base 55 and nozzle 56 have interface engagement where the channels 61 and 62 and port 63 open forwardly, there being jet passages 71, 72 and 73 through the nozzle to open at the front discharge end thereof. The supporting pilot flame is established by outer circumferentially spaced series of jet passages 72 in open communication with the outer channel 62. The high temperature preheat flame is established by an inner circumferentially spaced series of jet passages 71 in open communication with the inner channel 61. And, the ultimate cutting flame is established by a central jet passage 73 in open communication with the port 63. The arrangement of manifold channels and jet passages is clearly illustrated in FIGS. 3 and 4, whereby three distinct flames emanate from the nozzles 56; (1) a pilot flame, (2) a preheat flame, and (3) a cutting flame. In carrying out this invention, the pilot flame (1) is maintained continuously so as to ignite the preheat flame (2) when required, and the preheat flame is then maintained until the cutting zone is conditioned for cutting. The cutting flame (3) is then established by adding the cuting agent so as to made the continuous cut as it is shown started in FIG. 1.

The torch guide means E and pilot means F operate together to protect the nozzle 56 by shielding the discharge of gases and admixtures hereinabove described. As shown in FIGS. 1 and 4, a retractile shield 75 of means F slides over the nozzle 56 so as to be extended radially by a spring 76, and stopped by a ring 77. A key pin 78 engages a slot 79 in the shield to prevent its rotation, the shield being a forwardly open tube extending from the discharge end of the nozzle 56. In order to prevent encroachment of surrounding waters, the extending portion of shield 75 carries a manifold 80 that is coupled to the said fourth fluid supply line 54 to supply the displacement gas such as air, and thereby purge the flame chamber formed thereby ahead of the nozzle. The guide means E is shown comprised of a follower 82 in the form of a wheel that rides on the inner wall 11 of the casing, so as to pass over any obstructions such as scale and marine growth. The angular position of the follower 82 is adjusted by a clamp 83 having a blot 84 spaced from and parallel to bolt 41 of adjustment means 30, and set by a nut (not shown).

The shield 75 retracts on nozzle 56 when the wheel follower 82 passes over inner diameter obstructions, while maintaining a determined spaced relation to said inner wall 11 and any debris thereon. A spark generating means 90 shown in the form of a plug is exposed through the shield and to the flame chamber within the shield, and is powered through an electric cable 91 from above the water surface, to ignite the preheat flame and/or the pilot flame.

From the foregoing it will be understood how the torch cutting method of this invention is performed, and particularly the manner in which it is performed remotely and under water. The apparatus disclosed herein is especially adapted to cut from the interior of casing and the like, and is operated entirely remote and above the water surface to supply gas, gas admixture with metal powders, and fluid and electric power sources. A pilot flame and/or spark ignition means is provided for initiating the preheat flame, said preheat flame being a high heat powdered metal and gas flame for rapid conditioning of the cutting zone, and to which the cutting agent is added for cutting.

Having described only the typical preferred forms of my invention, I do not wish to be limited or restricted to the specific details herein set forth, but wish to reserve to myself any modifications or variations that may appear to those skilled in the art as set forth within the limits of the following claims.

I claim:

1. A method for cutting through metal walls and the like, and including;
   a first step of preheating a cutting zone on the wall with a preheat flame comprised of metal dust in a carrier of oxidizing gas and at a caloric output to attain preheat temperature in said cutting zone,
   and a second step of adding a calorie increasing cutting agent into the preheat flame to increase the caloric output of the preheat flame by burning the metal dust thereof at increased temperature together with the metal wall of the cutting zone and burning therethrough.

2. The method of cutting by burning through metal walls as set forth in claim 1, wherein the metal dust includes any one of the metals, magnesium, iron and aluminum, in powdered form carried by said oxidizing gas.

3. The method of cutting by burning through metal walls as set forth in claim 1, wherein the metal dust includes a combination of any one of the metals, magnesium, iron and aluminum, in powdered form carried by said oxidizing gas.

4. The method of cutting by burning through metal walls as set forth in claim 1, wherein the calorie increasing cutting agent is oxygen.

5. The method of cutting by burning through metal walls as set forth in claim 2, wherein the calorie increasing cutting agent is oxygen.

6. The method of cutting by burning through metal walls as set forth in claim 3, wherein the calorie increasing cutting agent is oxygen.

7. The method of cutting by burning through metal walls as set forth in claim 1, wherein the calorie increasing cutting agent is hydrogen flouride.

8. The method of cutting by burning through metal walls as set forth in claim 2, wherein the calorie increasing cutting agent is hydrogen flouride.

9. The method of cutting by burning through metal walls as set forth in claim 3, wherein the calorie increasing cutting agent is hydrogen flouride.

10. The method of cutting by burning through metal walls as set forth in claim 1, wherein the calorie increasing cutting agent is a mixture of oxygen and hydrogen flouride.

11. The method of cutting by burning through metal walls as set forth in claim 2, wherein the calorie increasing cutting agent is a mixture of oxygen and hydrogen flouride.

12. The method of cutting by burning through metal walls as set forth in claim 3, wherein the calorie increasing cutting agent is a mixture of oxygen and hydrogen flouride.

13. The method of cutting by burning through metal walls as set forth in claim 1, wherein the preheat flame temperature is in the range of 3500° to 5000° F., and wherein the second step burning is in excess of the preheat temperature.

14. The method of cutting by burning through metal walls as set forth in claim 1, wherein the preheat flame temperature is in the range of 3500° to 5000° F., and wherein the second step burning is in excess of 5000° F.

15. The method of cutting by burning through metal walls as set forth in claim 1, wherein the metal dust is powder of flake configuration.

16. The method of cutting by burning through metal walls as set forth in claim 1, wherein the metal dust is powder of atomized spherical configuration.

17. The method of cutting by burning through metal walls as set forth in claim 1, wherein the metal dust is of 100 to 300 micron mesh.

18. An apparatus for torch cutting of metal walls by using powdered metals admixed with gas, and including;
   a nozzle having at least two fluid connections thereto, a first connection for a metal powder admixed with a gas oxidizer and a second connection for a gas cutting agent, and having a jet passage for each of said connections and opening at a front discharge end of the nozzle,
   a means locating the discharge end of the nozzle in spaced relation to the metal wall to be cut,
   a means supplying the metal powder and gas oxidizer mixture to the first connection to discharge from said jet passage therefor and for ignition to establish a high temperature preheat flame at a cutting zone of the metal wall,
   and a means supplying the gas cutting agent to the second connection to discharge from said jet therefor to intensify the aforesaid preheat flame and thereby cut through the metal wall by burning and melting.

19. The apparatus for torch cutting of metal walls as set forth in claim 18, wherein there is a drive means for advancing the nozzle over the metal wall.

20. The apparatus for torch cutting of metal walls as set forth in claim 18, wherein there is a drive means comprised of a positive displacement fluid powered motor responsive to a rate of flow metering device for precise speed advancement of the nozzle over the metal wall.

21. The apparatus for torch cutting of metal walls as set forth in claim 18, wherein the nozzle has a circumferentially spaced series of jet passages for discharge of the metal powder and oxidizer admixture from the first connection thereto, and has a central jet passage for discharge of the gas cutting agent from the second connection thereto.

22. The apparatus for torch cutting of metal walls as set forth in claim 18, wherein the means locating the discharge end of the nozzle is comprised of retractile members extended into positioned engagement with the metal wall to hold the nozzle in said spaced relation to the metal wall to be cut.

23. The apparatus for torch cutting of metal walls as set forth in claim 18, wherein the means locating the discharge end of the nozzle is comprised of retractile members extended into positioned engagement with the metal wall to hold the nozzle in said spaced relation to the metal wall to be cut, and wherein there is a drive means for advancing the nozzle over the metal wall.

24. The apparatus for torch cutting of metal walls as set forth in claim 18, wherein the means supplying the metal powder and gas oxidizer is a pressure and rate of flow means supplying a mixture of metal powder in the range of 100 to 325 micron inch mesh and in a ratio of substantially 0.0666 pound of metal powder per cubic foot of gas oxidizer.

25. The apparatus for torch cutting of metal walls as set forth in claim 18, wherein the means supplying the gas cutting agent is a pressure and rate of flow means.

26. The apparatus for torch cutting of metal walls as set forth in claim 18, wherein the means locating the discharge end of the nozzle is comprised of retractile members extended into positioned engagement with the metal wall to hold the nozzle in said spaced relation to the metal wall to be cut, wherein there is a drive means for advancing the nozzle over the metal wall, wherein the nozzle has a circumferentially spaced series of jet passages for discharge of the metal powder and oxidizer admixture from the first connection thereto, and has a central passage for discharge of gas cutting agent from the second connection thereto, wherein the means supplying the metal powder and gas oxidizer is a pressure and rate of flow means supplying a mixture of metal powder in the range of 100 to 325 micron inch mesh and in a ratio of substantially 0.0666 pound of metal powder per cubic foot of gas oxidizer, and wherein the means supplying the gas cutting agent is a pressure and rate of flow means.

27. An apparatus for underwater torch of cutting of metal walls by using powdered metals admixed with gas, and including;
a nozzle having at least three fluid connections thereto, a first connection for a metal powder admixed with a gas oxidizer, a second connection for a gas cutting agent and a third connection for a combustible gas and oxidizer, and having a jet passage for each of said connections and opening at a front end of the nozzle,
a means locating the discharge end of the nozzle in spaced relation to the metal wall to be cut,
a means supplying the metal powder and gas oxidizer mixture to the first connection to discharge from said jet passage therefor and for ignition to establish a high temperature preheat flame at a cutting zone of the metal wall,
a means supplying the combustible gas and oxidizer to the third connection to discharge from said jet passage therefor for ignition to establish a pilot flame for ignition of the high temperature preheat flame,
and a means supplying the gas cutting agent to the second connection to discharge from said jet therefor to intensify the aforesaid preheat flame and thereby cut through the metal wall by burning and melting.

28. The apparatus for underwater torch cutting metal walls as set forth in claim 27, wherein there is a drive means for advancing the nozzle over the metal wall.

29. The apparatus for underwater torch cutting metals walls as set forth in claim 27, wherein the nozzle has at least two concentric circumferentially spaced series of jet passages, one for discharge of the metal powder and oxidizer admixture from the first connection thereto and the other for discharge of the combustible gas and oxidizer from the third connection thereto, and has a central jet passage for discharge of the gas cutting agent from the second connection thereto.

30. The apparatus for underwater torch cutting metal walls as set forth in claim 27, wherein the means locating the discharge end of the nozzle is comprised of retractile members extended into positioned engagement with the metal wall to hold the nozzle in said spaced relation to the metal wall to be cut.

31. The apparatus for underwater torch cutting metal walls as set forth in claim 27, wherein the means supplying the metal powder and gas oxidizer and the means supplying the combustible gas and oxidizer and the means supplying the gas cutting agent are each pressure and rate of flow means.

32. The apparatus for underwater torch cutting metal walls as set forth in claim 27, wherein there is a drive means for advancing the nozzle over the metal wall, wherein the nozzle has at least two concentric circumferentially spaced series of jet passages, one for discharge of the metal powder and oxidizer admixture from the first connection thereto and the other for discharge of the combustible gas and oxidizer from the third connection thereto, and has a central jet passage for discharge of the gas cutting agent from the second connection thereto, wherein the means locating the discharge end of the nozzle is comprised of retractile members extended into positioned engagement with the metal wall to hold the nozzle in said spaced relation to the metal wall to be cut, and wherein the means supplying the metal powder and gas oxidizer and the means supplying the combustible gas and oxidizer and the means supplying the gas cutting agent are each pressure and rate of flow means.

33. An apparatus for underwater torch cutting of tubular metal casing walls by using powdered metals admixed with gas, and including;
a body for insertion into the tubular metal casing and having a central axis,
a carriage and drive means for revolvement around the central axis of the body and within the tubular metal casing wall,
a nozzle supported by and disposed radially from the central axis of the body and carriage and having at least two fluid connections thereto, a first connection for a metal powder admixed with a gas oxidizer and a second connection for a gas cutting agent, and having a jet passage for each of said connections and opening at a front discharge end of the nozzle,
a means locating the central axis of the body concentric with respect to a center axis of the tubular metal casing and with the discharge end of the nozzle in spaced relation to an inner diameter wall of the tubular metal casing,
a means supplying the metal powder and gas oxidizer mixture to the first connection to discharge from said jet passage therefor and for ignition to establish a high temperature preheat flame at a cutting zone of the metal wall,
and a means supplying the gas cutting agent to the second connection to discharge from said jet therefor to intensify the aforesaid preheat flame and thereby cut through the metal wall by burning and melting.

34. The apparatus for underwater torch cutting of tubular metal casing walls as set forth in claim 33, wherein the body is suspended within the tubular metal casing.

35. The apparatus for underwater torch cutting of tubular metal casing walls as set forth in claim 33, wherein the carriage is in the form of a collar free to rotate on the body and the drive means is a motor that revolves the collar.

36. The apparatus for underwater torch cutting of tubular metal casing walls as set forth in claim 33, wherein retractile torch positioning means extends the torch from the carriage and drive means and into a predetermined position when the means locating the central axis of the body is operated to center the same.

37. The apparatus for underwater torch cutting of tubular metal casing walls as set forth in claim 36, wherein the retractile torch positioning means is a cylinder and piston means disposed on an axis radial to the central axis of the body and carriage.

38. The apparatus for underwater torch cutting of tubular metal casing walls as set forth in claim 33, wherein the nozzle has a third fluid connection thereto and a jet passage therefor, and wherein a means supplies combustible gas and oxidizer to the third connection to discharge from said jet passage therefor for ignition to establish a pilot flame for ignition of the high temperature preheat flame.

39. The apparatus for underwater torch cutting of tubular metal casing walls as set forth in claim 38, wherein a shield surrounds and extends from the front end of the nozzle to form a flame chamber separated from surrounding waters.

40. The apparatus for underwater torch cutting of tubular metal casing walls as set forth in claim 33, wherein a retractile shield surrounds and extends from the front end of the nozzle to form a flame chamber separated from surrounding waters and is biased into spaced relation to the inner diameter wall of the tubular metal casing by spring means limited by a stop.

41. The apparatus for underwater torch cutting of tubular metal casing walls as set forth in claim 40, wherein the stop is a wheel follower engageable with the inner diameter wall of the tubular metal casing.

42. The apparatus for underwater torch cutting of tubular metal casing walls as set forth in claim 38, wherein a shield surrounds and extends from the front end of the nozzle to form a flame chamber separated from surrounding waters, and wherein the shield has a fourth fluid connection and at least one jet opening into the chamber to purge the chamber with air from means supplying the same thereto.

43. The apparatus for underwater torch cutting of tubular metal casing walls as set forth in claim 38, wherein a retractile shield surrounds and extends from the front end of the nozzle to form a flame chamber separated from surrounding waters and is biased into spaced relation to the inner diameter wall of the tubular metal casing by spring means limited by a stop, and wherein the shield has a fourth fluid connection and at least one jet opening into the chamber to purge the chamber with air from means supplying the same thereto to prevent encroachment of the surrounding waters.

44. The apparatus for underwater torch cutting of tubular metal casing walls as set forth in claim 43, wherein the stop is a wheel follower engageable with the inner diameter wall of the tubular metal casing.

45. The apparatus for underwater torch cutting of tubular metal casing walls as set forth in claim 33, wherein the means locating the central axis of the body concentric with respect to the center axis of the tubular metal casing is comprised of longitudinally spaced sets of retractile radially disposed legs extended by means into positioned engagement with the inner diameter wall of the tubular metal casing.

46. The apparatus for underwater torch cutting of tubular metal casing walls as set forth in claim 33, wherein the means locating the central axis of the body concentric with respect to the center axis of the tubular metal casing is comprised of longitudinally spaced sets of three retractile and radially disposed legs extended by cylinder and piston means into positioned emgagement with the inner diameter wall of the tubular metal casing.

47. The apparatus for underwater torch cutting of tubular metal casing walls as set forth in claim 33, wherein the body is suspended within the tubular casing, wherein the carriage is in the form of a collar free to rotate on the body and the drive means is a motor that revolves the collar, wherein a retractile shield surrounds and extends from the front end of the nozzle to from a flame chamber separated from surrounding waters and is biased into spaced relation to the inner diameter wall of the tubular metal casing by spring means limited by a stop, wherein the shield has a fourth fluid connection and at least one jet opening into the chamber to purge the chamber with air from means supplying the same thereto to prevent encroachment of the surrounding waters, wherein the stop is a wheel follower engageable with the inner diameter wall of the tubular metal casing, and wherein the means locating the central axis of the body concentric with respect to the center axis of the tubular metal casing is comprised of longitudinally spaced sets of three retractile and radially disposed legs extended by cylinder and piston means into positioned engagement with the inner diameter wall of the tubular metal casing.

* * * * *